Patented June 15, 1954

2,681,285

UNITED STATES PATENT OFFICE 2,681,285

SEGREGATION OF POTATO TISSUE OF REDUCED BROWNING TENDENCIES

Carl E. Hendel, El Cerrito, and Harold S. Olcott, Berkeley, Calif., assignors to the United States of America as represented by the Secretary of Agriculture No Drawing. Application September 3, 1952, Serial No. 307,724

8 Claims. (Cl. 99—207)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is granted to the Government of the United States of America.

This application is a continuation-in-part of our copending application Serial No. 201,674, filed December 19, 1950, now abandoned.

This invention relates to the production of potato food products and the prime object of this invention is the provision of novel methods for producing potato products which exhibit reduced browning tendencies. Thus, in contrast to conventional products, the products in accordance with this invention will retain their natural color and flavor even though they are stored at elevated temperatures for long periods of time. Further objects and advantages of this invention will be obvious from the description herein.

In the preparation of potato products, the problem of discoloration or browning is one that causes considerable difficulty. In general, the discoloration may be caused by two separate reactions or a combination of both. The first to be considered is enzymatic browning; this involves the reaction of oxygen from the air with certain oxidizable substances in the potato tissue, the oxidation being catalyzed by enzymes present in the tissue. Although this type of discoloration is commonly referred to as enzymatic browning, it actually causes development of a gray color in dehydrated potato products. This type of browning can be controlled by blanching the potatoes with hot water or steam or by treating them with a sulphiting agent. This invention is not concerned with enzymatic browning—current methods for controlling it are generally adequate. The second type of discoloration or browning, that with which this invention is directly concerned, is non-enzymatic browning. This manifestation is believed to involve a reaction between the reducing sugars and nitrogenous substances in the potatoes whereby dark-colored reaction products are produced. Thus if potatoes are first adequately blanched or sulphited, they will still become brown when subjected to elevated temperatures. This type of browning is particularly important in the case of dehydrated potatoes which are stored at relatively high temperatures, as for example in tropical or semi-tropical climates. In such case the dehydrated product will rapidly become dark and develop an unacceptable scorched flavor. Perhaps the most significant fact about non-enzymatic browning is that the rate of browning increases very rapidly with increasing temperature. Thus a product may be perfectly stable at room temperature for many months whereas at temperatures of 100° F., the product may become totally unacceptable in the same period. Browning occurs not only during storage, but also during processing; thus any application of heat during processing will cause some degree of browning depending on the temperature, moisture content, and duration of the heat treatment. In processing, heat is always applied at some stage in the manufacture of the product, thus heat may be applied for blanching, cooking, dehydration, frying, sterilizing, and so forth. Regardless of what purpose is behind the heat treatment, it will accelerate the rate of color formation by non-enzymatic browning. Development of color is particularly rapid when heat is applied to tubers having an intermediate moisture content (about 20–30%), thus the problem is especially acute in such processing steps as dehydration and frying. The unmodified expression "browning" is used herein to mean non-enzymatic browning.

The mechanism of non-enzymatic browning has been investigated by many scientists and various techniques have been proposed for its control. Thus it is known that the rate of non-enzymatic browning can be decreased in several different ways, for example, by sulphite, by drying the product to a very low moisture content (as by in-package desiccation), by leaching with water prior to dehydration, and by low temperature storage of the products. However, all of these techniques are subject to certain disadvantages. For example, the use of sulphite is prohibited in several States; dehydration to very low moisture levels is expensive and technologically difficult; leaching with water removes valuable nutrients and flavor components; low temperature storage involves the use of expensive refrigeration equipment.

We have now found that the problem of non-enzymatic browning can be minimized by cutting the tubers and fractionating the pieces, selecting those which have low browning tendencies for use in preparing the products which are liable to be subjected to excessively high temperatures.

The basis of our invention is that we have found that each individual tuber contains tissue of widely differing browning tendencies. In general, a band of tissue about ¼″ inside the skin and also a portion of the tissue near the center of the tuber exhibit a high browning tendency whereas the remainder of the tissue in the tuber exhibits a low browning tendency. The exact size and location of the areas of high browning tendency tissue will vary with different sizes and varieties of potatoes and/or the location and conditions where they were grown. In proceeding in accordance with this invention, the basic idea is to separate the tissue of high browning tendency from the tissue of low browning tendency. The tissue of low browning tendency is then subjected to the desired processing treatment, be it blanching, sulphiting, dehydration, frying, sterilization, or whatever the processing may involve. The processing may be an incident to any desired type of preserving treatment such as freezing, maintaining in cold storage for limited periods of time, dehydration, canning, or any combination of these, for example, partial dehydration followed by freezing (Howard et al., U. S. Patent No. 2,477,605) or partial dehydration followed by canning (Kaufman et al., patent application, Ser. No. 246,146, filed September 11, 1951). The processing or preserving in any case yields better products than have been known before this invention because the products in accordance with this invention resist discoloration when stored at elevated temperatures or when stored at ordinary temperatures for extended periods of time.

With regard to segregating the areas of high browning tendency tissue and low browning tendency tissue, it is to be noted that these areas are not sharply defined and cannot be distinguished visually as their appearance is uniform with the remainder of the tuber. Hence the areas cannot be separated by such simple techniques as sectioning with a knife. In further study on the situation, we found that the tissues of differing browning tendency exhibit different densities—the tissue of high browning tendency having a lower density than the tissue of low browning tendency. Consequently the different types of tissue may be separated by various techniques which are adapted for the separation of mixtures by reason of differences in density of the individual particles or pieces which make up the mixture. Such techniques may be referred to generically as density fractionation. A preferred technique for accomplishing this separation, or fractionation as it may be called, is a procedure based on the buoyancy of individual pieces of tissue in a brine or other liquid medium of selected specific gravity. To utilize this technique the following steps are carried out:

The tubers are peeled, washed, and then cut into small pieces suitable for their intended, ultimate use. Thus they may be cut into dice, elongated dice, slices, shoestrings, etc. or any of the usual forms used in preparing potato products. Preferably the pieces should have a volume of not more than about 0.125 cu. in. The potato pieces are then subjected to the buoyant effect of a liquid medium. This involves preparing a brine by dissolving common salt in water in such proportions to produce a solution having a specific gravity in the range from about 1.060 to about 1.090. The potato pieces are then placed in this brine and the sinkers (the potato pieces which sink) and the floaters (the potato pieces which float) are separately removed. Since we have found that the potato tissue with highest browning tendency has the lowest specific gravity and vice versa, one can thus easily separate the potato pieces according to browning tendency. The specific gravity of the pieces which exhibit a desirable low browning tendency cannot be expressed in concrete terms to fit all cases because it will vary in each particular case depending on the variety of potato, locality where grown, time of storage and other factors. Thus for example with some varieties of potatoes which in the gross have a low specific gravity the desirable pieces, those with low browning tendencies, may be the fraction which sinks in a 1.060 sp. gr. brine; on the other hand with denser varieties of potatoes the desired fraction may be those which sink in a brine of 1.090 sp. gr.

One method of determining the proper fraction to separate from a given lot of potatoes is to prepare several brines of varying specific gravity and use these brines to fractionate samples of the given lot of cut potatoes. The sinkers in each brine are then separately blanched, dehydrated, then subjected to an elevated temperature, say 65° C. to determine which brine produced a product of satisfactory browning tendencies. The browning tendency of each lot can be determined for example by the method of Hendel et al., Food Technology, vol. IV, pp. 344–347 (1950). Thus samples of the dehydrated products (8% moisture content) before and after storage at 65° C. for 16 hours are extracted with 55% ethanol (5 g. potato per 100 ml. 55% ethanol) and the optical density of the extracts is determined with a photometer at 390 millimicrons with a 2 cm. cell. In such case the desired fraction of potato pieces would be one in which the optical density increase due to the storage at 65° C. for 16 hours would be not more than about 0.15 optical density unit.

Another technique which may be used to segregate the desirable tissue from a given lot of potatoes involves placing a sample of the cut potatoes into a brine and adjusting the specific gravity of the brine, within the general range from about 1.060 to about 1.090, by addition of water or salt so the specific gravity of the brine is such that a desired proportion of the cut potatoes will sink. As the specific gravity of the brine is increased, a smaller proportion of the tubers will sink and the lower will be the browning tendency of these sinkers. In general if the specific gravity of the brine is such that 70% or less of the pieces sink, the resulting sinkers will yield products definitely superior to those prepared from the original unfractionated stock. For preparing an even more stable product the brine may be adjusted to such a specific gravity that 60% or less of the pieces sink. The specific gravity of the brine may be further increased to obtain fractions of increasing stability though it must be borne in mind that each increase in brine density will result in a smaller proportion of the sinker fraction to the total.

In the fractionation in a liquid medium, described above, we usually prefer to use a solution of salt in water to achieve the separation of pieces of high and low browning tendency. Salt is of course inexpensive, non-toxic and widely used as a flavoring for potatoes and other foods. However, it is not essential to use an aqueous salt solution and other non-toxic solutions may be used, since the essential attribute of the fractionating medium is its density and not its chemical composition. Thus instead of salt solution one could use any non-toxic liquid medium of the proper specific gravity. Examples of other solutes which can be added to water to produce a fractionating medium are calcium chloride, potassium chloride, sucrose, dextrose, etc. If desired, antioxidant materials such as ascorbic acid, flavorings, coloring materials or other adjuvants may be added to the fractionating medium.

If desired, the fractionation in a liquid medium may be applied more than once, as shown in the examples, to divide the original lot of cut potatoes into a series of fractions. In such case the least dense fraction will have the highest browning tendency and the other fractions will have decreasing browning tendencies correlated with increasing density.

Although we prefer to use a fractionation technique dependent on the specific gravity of a liquid medium, it is not essential to use such a scheme. Thus, for instance, the potatoes cut as above described may be fractionated by a pneumatic method. In this technique the potatoes, cut into pieces of uniform size, are individually propelled into the air in a horizontal direction, each with uniform force whereby the pieces will be deposited at varying distances from the point of propulsion. Thus the denser pieces will land close to the point of propulsion whereas the less dense pieces will land at a further distance. Another technique involves establishing an upward current of water in a vessel. The cut potatoes are introduced by a screw feeder or similar mechanism into the vessel near the bottom. In this case the less dense pieces will be carried up and out of the vessel by the water current whereas the denser pieces will sink to the bottom of the vessel because the effect of gravity on these pieces exceeds the force of the upward current on the particles.

Proceeding in accordance with the preferred modification of this invention, the potatoes are peeled, cut into pieces and the pieces fractionated by the brine fractionation treatment. Thus the potato pieces are placed in a salt water solution of such specific gravity within the general range from about 1.060 to about 1.090 so that not more than 70%, preferably not more than 60% of the potato pieces will sink. This sinker fraction constituting the pieces of low browning tendency are separated and subjected to the desired processing treatment. For example, if it is desired to produce dehydrated potatoes then this fraction is subjected to blanching or blanching plus sulphiting to destroy or inactivate the enzymes. The potato pieces are then subjected to conventional dehydration technique. The resulting products can be shipped in commerce without considering ambient temperatures as they will not brown excessively. If it is desired to make fried potatoes, then the fractionated potato pieces are fried and packaged as in the usual practice. If the fried products are to be kept for extended periods of time they may be frozen. The fractionated potato pieces may be canned or frozen or partially dehydrated then canned or frozen. It is evident that the fractionated potatoes may be subjected to any processing or preserving treatments whether for preservation for extended periods of time or for temporary storage for a few days or weeks.

The floaters—the fraction which exhibits excessive browning tendencies—can also be subjected to a desired processing treatment with the fore-knowledge that they should be preserved at low temperature because of their unstable character. Other applications in industry where conditions which cause browning can be avoided will be evident to those skilled in the art.

The following examples demonstrate how this invention may be carried out in practice. These examples are furnished only by way of illustration and not limitation.

EXAMPLE I

A lot of Kern County, Calif., White Rose potatoes was obtained. These tubers had a specific gravity from 1.075 to 7.080. The potatoes were peeled, cut into "half-dice" $\tfrac{3}{8}'' \times \tfrac{3}{8}'' \times \tfrac{3}{16}''$ and the dice washed. The dice were subjected to gravity separation to obtain three batches, as follows:

*Batch A.*—Specific gravity less than 1.075, comprising 46% of the dice.

*Batch B.*—Specific gravity from 1.075 to 1.080, comprising 40% of the dice.

*Batch C.*—Specific gravity more than 1.080, comprising 14% of the dice.

The gravity separation used to obtain these three batches was carried out as follows:

A brine was prepared by dissolving salt (sodium chloride) in water in such proportions that the brine had a specific gravity of 1.080. This brine was placed in a vessel and into it was introduced the dice. The dice which remained suspended in the brine because their specific gravities were less than 1.080 were removed by scooping them out with a strainer. The dice which sank to the bottom of the brine were then removed—these dice constituted batch C, those of specific gravity more than 1.080. The dice which had been suspended by the 1.080 sp. gr. brine and separated therefrom were then subjected to a second fractionation. To this end, these dice were placed in a vessel containing a brine (salt dissolved in water) having a specific gravity of 1.075. The dice which remained suspended in the brine were removed by scooping them out with a strainer—these dice constituting batch A—specific gravity less than 1.075. The dice which sank to the bottom of the 1.075 brine were then removed—these constituted batch B—specific gravity 1.075 to 1.080.

All three batches were separately treated as follows: The dice were blanched 3 minutes with steam at 212° F. then dehydrated in a tunnel dryer at a dry bulb temperature of 140° F., wet bulb temperature 86° F., to a moisture content of 8%. A sample of each dehydrated product was subjected to a temperature of 65° C. for 16 hours to ascertain the effect of high temperature on the product. The degree of browning of each product including the undamaged and heat-damaged portions were then determined by making extracts with 55% ethanol of the dehydrated products (5 grams potato per 100 ml. of 55% ethanol) and making determinations of transmittance and optical density on the extracts with a photometer. These measurements were made at 390 millimicrons with a 2 cm. cell. This technique of measuring degree of browning is disclosed by Hendel et al., Food Technology, vol. 4, pp. 344–347 (1950). The results obtained are summarized in the following tables.

*Table 1.—Transmittance data*

| Sample | Specific gravity | Transmittance, undamaged sample, percent | Transmittance after heat damage, percent | Decrease in transmittance due to heat damage, percent |
|---|---|---|---|---|
| A | less than 1.075 | 60 | 30 | 50 |
| B | 1.075–1.080 | 65.5 | 53.5 | 18.3 |
| C | greater than 1.080 | 66.5 | 58.0 | 12.8 |

Table 2.—Optical density

| Sample | Specific gravity | Optical density ×10³, undamaged sample | Optical density ×10³, after heat damage | Increase in optical density due to heat damage ×10³ |
|---|---|---|---|---|
| A | less than 1.075 | 221 | 522 | 301 |
| B | 1.075–1.080 | 182 | 271 | 89 |
| C | greater than 1.080 | 177 | 236 | 59 |

The above figures show that samples B and C have much higher resistance to browning than sample A. For instance the heat damaging treatment (65° C. for 16 hours) decreased the transmittance of sample A by 50% whereas the transmittances of samples B and C were decreased by only 18.3% and 12.8%, respectively. In terms of optical density the heat damaging treatment increased the optical density of sample A by $301 \times 10^{-3}$ optical density units while increasing that of samples B and C by $89 \times 10^{-3}$ and $59 \times 10^{-3}$ units, respectively.

EXAMPLE II

A lot of Klamath, Ore., Russet Burbank potatoes was obtained. These tubers had a specific gravity from 1.080 to 1.090.

The potatoes were peeled, cut into "half-dice" $3/8'' \times 3/8'' \times 3/16''$ and the dice washed. The dice were then subjected to gravity separation to obtain three batches as follows:

Batch D.—Specific gravity less than 1.080, comprising 43% of the dice.

Batch E.—Specific gravity 1.080–1.090, comprising 53% of the dice.

Batch F.—Specific gravity more than 1.090, comprising 4% of the dice.

The gravity separation technique used to obtain these three fractions was carried out as follows:

A brine was prepared by dissolving salt (sodium chloride) in water in such proportions that the brine had a specific gravity of 1.090. This brine was placed in a vessel and into it was placed the dice. The dice which remained suspended in the brine because their specific gravity was less than 1.090 were removed by scooping them out with a strainer. The dice which sank to the bottom of the brine were then removed—these dice constituted batch F, those of specific gravity more than 1.090. The dice which had been suspended by the 1.090 sp. gr. brine and separated therefrom were then subjected to a second fractionation. To this end, these dice were placed in a vessel containing a brine (salt dissolved in water) having a specific gravity of 1.080. The dice which remained suspended in the brine were removed by scooping them out with a strainer—these dice constituting batch D—specific gravity less than 1.080. The dice which sank to the bottom of the 1.080 sp. gr. brine were then removed—these constituted batch E—specific gravity 1.080 to 1.090.

All three batches were treated as follows: The dice were blanched 3 minutes with steam at 212° F. then dehydrated in a tunnel drier at a dry bulb temperature of 140° F., 86° F. wet bulb, to a moisture content of 10%. Samples of each batch were subjected to the heat damaging treatment, 65° C. for 16 hours. The degree of browning of each product including both the undamaged and heat-damaged samples, was determined as in Example I. The results are tabulated below:

Table 3.—Transmittance data

| Sample | Specific gravity | Transmittance, undamaged sample, percent | Transmittance after heat damage, percent | Decrease in transmittance due to heat damage, percent |
|---|---|---|---|---|
| D | less than 1.080 | 58.5 | 32 | 45.4 |
| E | 1.080–1.090 | 67.5 | 55.5 | 18.0 |
| F | greater than 1.090 | 70 | 61 | 12.8 |

Table 4.—Optical density

| Sample | Specific gravity | Optical density ×10³, undamaged sample | Optical density ×10³, after heat damage | Increase in optical density due to heat damage ×10³ |
|---|---|---|---|---|
| D | less than 1.080 | 233 | 495 | 262 |
| E | 1.080–1.090 | 170 | 255 | 85 |
| F | greater than 1.090 | 154 | 214 | 60 |

Having thus described our invention, we claim:

1. In the process of preserving potatoes wherein the potatoes are subjected to at least one treatment at an elevated temperature, the improvement which comprises initially cutting the potatoes into pieces, subjecting the potato pieces to density fractionation to isolate the denser pieces having low browning tendencies and subjecting these pieces to the preservation process.

2. In the process of preserving potatoes wherein the potatoes are subjected to at least one treatment at an elevated temperature, the improvement which comprises initially cutting the potatoes into pieces, introducing the pieces into a liquid medium having a specific gravity in the range from about 1.060 to about 1.090 so that not more than 70% of the pieces will sink, isolating the pieces which sink and which have low browning tendencies, and subjecting them to the preservation process.

3. In the process of preparing dehydrated potatoes, the improvement which comprises initially cutting the potatoes into pieces, subjecting the potato pieces to density fractionation to isolate the denser pieces having low browning tendencies and subjecting these pieces to the dehydration process.

4. In the process of preparing dehydrated potatoes, the improvement which comprises initially cutting the potatoes into pieces, introducing the pieces into a liquid medium having a specific gravity from about 1.060 to about 1.090 so that not more than 70% of the pieces will sink, isolating the pieces which sink and which have low browning tendencies, and subjecting them to the dehydration process.

5. In the process of preparing dehydrated potatoes wherein raw potatoes are cut into pieces, the pieces blanched and then dehydrated, the improvement which comprises introducing the pieces of raw potato into a brine having a specific gravity from about 1.060 to about 1.090 so that not more than 70% of the pieces will sink, isolating the pieces which sink and which have low browning tendencies, and subjecting them to the blanching and dehydration treatments.

6. A process for isolating from potatoes the fraction of potato tissue which exhibits low browning tendencies comprising cutting raw potatoes into pieces, subjecting the pieces to density fractionation, and isolating the denser pieces, those which exhibit low browning tendencies.

7. A process for isolating from potatoes the fraction of potato tissue which exhibits low browning tendencies comprising cutting raw potatoes into pieces, introducing the pieces into a liquid medium having a specific gravity from about 1.060 to about 1.090 so that not more than 70% of the pieces will sink, and isolating the pieces which sink, those which exhibit low browning tendencies.

8. A process for isolating from potatoes the fraction of potato tissue which exhibits low browning tendencies comprising cutting raw potatoes into pieces, introducing the pieces into an aqueous salt solution having a specific gravity from about 1.060 to about 1.090 so that not more than 70% of the pieces will sink, and isolating the pieces which sink being the fraction which exhibits low browning tendencies.

References Cited in the file of this patent

UNITED STATES PATENTS

| Number | Name | Date |
|---|---|---|
| 1,259,631 | King | Mar. 19, 1918 |
| 2,119,612 | Thurber | June 7, 1938 |
| 2,176,347 | Jansen | Oct. 17, 1939 |
| 2,420,322 | Matarazzo | May 13, 1947 |
| 2,569,075 | Schade | Sept. 25, 1951 |
| 2,578,808 | Johnson et al. | Dec. 18, 1951 |
| 2,620,069 | Wendt | Dec. 2, 1952 |
| 2,628,905 | Antle et al. | Feb. 17, 1953 |

FOREIGN PATENTS

| Number | Country | Date |
|---|---|---|
| 468,018 | Great Britain | June 28, 1937 |